United States Patent Office 3,441,542
Patented Apr. 29, 1969

3,441,542
PREPARATION OF POLYESTERS CONTAINING BORON AND NITROGEN
Olden E. Paris, Wilmington, Del., assignor to E. I. du Pont de Nemours and Company, Wilmington, Del., a corporation of Delaware
No Drawing. Filed Feb. 20, 1964, Ser. No. 346,119
Int. Cl. C08g 17/137; C06d 5/00; C10l 5/40
U.S. Cl. 260—78.4          2 Claims

ABSTRACT OF THE DISCLOSURE

Process for preparing solid polyesters containing nitrogen and boron, which comprises condensing essentially equimolar amounts of hydroxyalkylammonium or hydrazonium salt of decahydrodecaboric acid or dodecahydrododecaboric acid and a dicarboxylic acid or anhydride at a temperature of from 150 to 250° C. in an inert atmosphere. Said compositions being useful as high energy propellants.

---

Compositions containing boron, nitrogen, and hydrogen are desirable in propellant compositions because of the low molecular weight of combustion products, a factor which favors high specific impulse. Other properties desirable in the propellant compositions include impact and static insensitivity, thermal stability, and achievement of high impulse at low chamber temperatures.

In accordance with this invention, compositions are provided which are useful as high energy propellants either in the form of homogeneous solid propellants or in a formulation balanced with other components such as hydrazine to provide a B/N ratio of 1. The compositions are polymeric esters of hydroxyalkylammonium or hydroxyalkylhydrozonium salts of decahydrodecaboric acid ($H_2B_{10}H_{10}$) and dodecahydrododecaboric acid ($H_2B_{12}H_{12}$). They are prepared by condensing, at a temperature of about 150 to 250° C. in an inert atmosphere, essentially equimolar amounts of 2–4 carbon hydroxyalkylammonium or hydroxyalkylhydrozonium salt of decahydrodecaboric acid or dodecahydrododecaboric acid and a dicarboxylic compound selected from the group consisting of maleic acid, succinic acid, phthalic acid, and the anhydrides thereof.

Specific examples of hydroxyalkylammonium and hydrazonium salts of decahydrodecaboric acid and dodecahydrododecaboric acid suitable for preparing the novel polyester resins of the invention are, for example, 2-hydroxy-ethylammonium decahydrodecaborate and dodecahydrododecaborate, 2-hydroxyethylhydrazonium decahydrodecaborate and dodecahydrododecaborate, 2-hydroxypropylammonium decahydrodecaborate or dodecahydrododecaborate, 2-hydroxypropylhydrazonium decahydrodecaborate or dodecahydrododecaborate, hydroxy-tert-butylammonium decahydrodecaborate or dodecahydrododecaborate, 1 - methyl-2-hydroxypropylammonium decahydrodecaborate or dodecahydrododecaborate, 1-methyl - 2 - hydroxypropylhydrozonium decahydrodecaborate. The preferred salt is 2-hydroxyethylhydrazonium decahydrodecaborate.

The reaction by which the resins of the present invention are prepared is effected at elevated temperatures. While the particular temperature used is not a critical factor provided it is sufficient to volatilize the water formed, temperatures within the range of 150–250° C. have been found to give satisfactory resins in suitable reaction times. The reaction mixture ordinarily is heated until all water formed in the polyesterification is expelled from the reaction vessel.

The reaction is conducted in the presence of an inert atmosphere, such as nitrogen, carbon dioxide, helium, or argon.

The physical properties and the degree of polymerization of the polymeric esters are not critical for achieving high specific impulse but the mechanical properties of the polymer may be utilized in the formulation of homogeneous solid propellants. Generally, polymeric esters with an intrinsic viscosity greater than 0.1, and preferably greater than 0.2 are utilized in the formulation of propellants. Molecular weight of the polymeric esters is enhanced by the incorporation of stoichometric ratios of ingredients, effective removal of water of condenstaion, and return of volatile ingredients to the reaction mass during esterification.

The preparation of substituted amine salts of decahydrodecaboric acid is disclosed in copending application Ser. No. 6,845, filed February 5, 1960, and now U.S. Patent No. 3,149,163, issued Sept. 15, 1964. The preparation of trialkylammonium salts of dodecahydrododecaboric acid is disclosed in copending application Ser. No. 99,015 filed March 28, 1961, now abandoned.

The invention is illustrated by the following examples, in which parts are by weight.

Example 1

A solution of 3.22 parts of triethylammonium decahydrodecaborate and 1.72 parts of 88.5% 2-hydroxyethylhydrazine in 25 parts water is evaporated to dryness in vacuo at 100° C. The residue, 2.72 parts of 2-hydroxyethylhydrozonium decahydrodecaborate, is stirred with 1.48 parts of phthalic anhydride under a nitrogen atmosphere while the temperature is raised to 150° C., at which temperature vigorous polymerization takes place. The resulting resin is stirred at 150° C. under a nitrogen atmosphere for a period of 3 hours and then cooled. A brittle, amber resin (3.66 parts, 91% yield) is obtained. The resin, which is hypergolic with concentrated nitric acid, is insensitive to impact and to static charge, and does not ignite in air at 250° C. In a sealed capillary tube, the resin softens at 120–190° C. but shows no further change to a temperature of 300° C. Elemental analysis of the resin salt indicates the following: C, 41.5%; H, 8.85%; N, 12.3%; and B, 20.7%.

Similar polyester resins are prepared from 2-hydroxyethylhydrazonium dodecahydrododecaborate and phthalic anhydride, from phthalic anhydride and 2-hydroxyethylammonium decahydrodecaborate, from maleic anhydride and hydroxy-tert-butylammonium decahydrodecaborate, from succinic anhydride and 2-hydroxypropylhydrazonium decahydrodecaborate, from phthalic acid and 1-methyl-2-hydroxypropylammonium dodecahydrododecaborate.

Additional polyester compositions are prepared by the same process by combining the reactants in the proportions listed in the following tabulation.

| Ex. No. | Boron and nitrogen-containing ingredient | Parts by wt. | Anhydride | Parts by wt. |
|---|---|---|---|---|
| 2 | 2-hydroxyethylhydrazonium dodecahydrododecarborate. | 296 | Phthalic | 148 |
| 3 | 2-hydroxyethylammonium decahydrodecaborate. | 242 | do | 148 |
| 4 | Hydroxy-tert-butyl-ammonium decahydrodecaborate. | 298 | Maleic | 98 |
| 5 | 2-Hydroxypropylhydrazonium decahydrodecaborate. | 270 | Succinic | 100 |
| 6 | 1-methyl-2-hydroxypropylammonium dodecahydrododecaborate. | 322 | Phthalic acid | [1] 164 |
| 7 | 2-hydroxyethylhydrazonium decahydrodecaborate. | 272 | Succinic | 100 |

[1] Acid.

The calculated specific impulse can be increased by combining the polyester monopropellant with hydrazine to produce a greater energy release in the combustion process. For example, the polyester from succinic anhydride and 2-hydroxyethylhydrazonium decahydrodecaborate has a calculated specific impulse of 226 seconds as a monopropellant, which is increased to 265 seconds by formulation with sufficient hydrazine (0.27 parts) to give a B/N ratio of 1.00. Additional data illustrating the theoretical impulse from formulations containing hydrazine are shown in the following tabulation.

| Example | Theoretical specific impulse (balanced with $N_2H_4$ to form B/N in combustion products) | | |
|---|---|---|---|
| | Resin, parts | $N_2H_4$, parts | Isp, secs. |
| 2 | 76.9 | 23.1 | 260 |
| 3 | 74.4 | 25.6 | 250 |
| 4 | 74.7 | 25.3 | 248 |
| 5 | 80.0 | 20.0 | 257 |
| 6 | 73.8 | 26.2 | 247 |
| 7 | 78.7 | 21.3 | 265 |

I claim:

1. A process for preparing polyester reaction products of a salt selected from the group consisting of 2-4 C hydroxyalkyl-ammonium decahydrodecaborates, 2-4 C hydroxyalkylhydrazonium decahydrodecaborates, 2-4 C hydroxyalkylammonium dodecahydrododecaborates and 2-4 C hydroxyalkylhydrazonium dodecahydrododecaborates and a dicarboxylic compound selected from the group consisting of phthalic acid, maleic acid, succinic acid, and the anhydrides thereof, which comprises condensing essentially equimolar amounts of said salt and dicarboxylic compound at a temperature of from 150 to 250 ° C. in an inert atmosphere.

2. A process of claim 1 wherein said salt is 2-hydroxyethylhydrazonium decahydrodecaborate.

References Cited

UNITED STATES PATENTS 3,184,499   5/1965   Donovan et al.
3,351,616   11/1967   Green et al.

JOSEPH L. SCHOFER, *Primary Examiner.*

J. KIGHT, *Assistant Examiner.*

U.S. Cl. X.R.

44—4; 260—462, 563, 568, 569, 570.5, 606.5